(12) United States Patent
Geelen et al.

(10) Patent No.: US 7,930,101 B2
(45) Date of Patent: Apr. 19, 2011

(54) NAVIGATION DEVICE AND METHOD FOR ENHANCED MAP DISPLAY

(75) Inventors: Pieter Geelen, Amsterdam (NL); Sven-Erik Jurgens, Paris (CA)

(73) Assignee: TomTom International B.V., Amsterdam (NL)

( * ) Notice: Subject to any disclaimer, the term of this patent is extended or adjusted under 35 U.S.C. 154(b) by 685 days.

(21) Appl. No.: 11/907,231

(22) Filed: Oct. 10, 2007

(65) Prior Publication Data

US 2008/0165182 A1 Jul. 10, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,588, filed on Jan. 10, 2007.

(51) Int. Cl.
*G01C 21/00* (2006.01)

(52) U.S. Cl. .................................. 701/211; 345/611

(58) Field of Classification Search ............... None
See application file for complete search history.

(56) References Cited

U.S. PATENT DOCUMENTS

| | | | |
|---|---|---|---|
| 5,454,062 A | 9/1995 | La Rule | |
| 6,073,094 A | 6/2000 | Chang et al. | |
| 6,163,269 A * | 12/2000 | Millington et al. | 340/815.4 |
| 6,529,826 B2 | 3/2003 | Kawai et al. | |
| 6,591,190 B2 * | 7/2003 | Nishida et al. | 701/211 |
| 6,710,774 B1 * | 3/2004 | Kawasaki et al. | 345/419 |

(Continued)

FOREIGN PATENT DOCUMENTS

JP 2000-214766 * 8/2000

(Continued)

OTHER PUBLICATIONS

US Office Action dated Jan. 20, 2011, issued in Co-Pending U.S. Appl. No. 11/907,232.

*Primary Examiner* — Michael J. Zanelli
(74) *Attorney, Agent, or Firm* — Jacob Eisenberg; Donald J Daley

(57) ABSTRACT

A method and device are disclosed for navigation. In at least one embodiment, the method includes determining map information for display on an integrated input and display device of a navigation device, based upon a determined route of travel of the navigation device; determining, prior to display on the integrated input and display device of the navigation device, whether or not the determined map information includes at least one designated pattern; enhancing, upon determining that the determined map information includes at least one designated pattern, the determined at least one designated pattern; and displaying the determined map information, including the enhanced at least one designated pattern, in three dimensions on the integrated input and display device of the navigation device. In at least one embodiment, the navigation device includes a processor to determine map information for subsequent display, based upon a determined route of travel of the navigation device, the processor further being useable to determine, prior to display, whether or not the determined map information includes at least one designated pattern and to enhance, upon determining that the determined map information includes at least one designated pattern, the determined at least one designated pattern; and an integrated input and display device to display the determined map information, including the enhanced at least one designated pattern, in three dimensions.

13 Claims, 15 Drawing Sheets

U.S. PATENT DOCUMENTS

| | | |
|---|---|---|
| 6,871,143 B2 * | 3/2005 | Fujiwara ........................ 701/211 |
| 7,643,654 B2 * | 1/2010 | Fujiwara et al. .............. 382/104 |
| 7,756,353 B2 * | 7/2010 | Chen ............................. 382/266 |
| 2005/0216185 A1 | 9/2005 | Takezaki et al. |
| 2006/0253251 A1 | 11/2006 | Puranik et al. |
| 2007/0260456 A1 | 11/2007 | Proux et al. |
| 2008/0045236 A1 | 2/2008 | Nahon et al. |
| 2008/0238933 A1 * | 10/2008 | Wako ........................... 345/617 |

FOREIGN PATENT DOCUMENTS

| | | | |
|---|---|---|---|
| JP | 2002-168634 | * | 6/2002 |
| JP | 2006-058530 | * | 3/2006 |

* cited by examiner

NAVIGATION DEVICE AND METHOD FOR ENHANCED MAP DISPLAY

PRIORITY STATEMENT

The present application hereby claims priority under 35 U.S.C. §119(e) on each of U.S. Provisional Patent Application Nos. 60/879,523 filed Jan. 10, 2007, 60/879,549 filed Jan. 10, 2007, 60/879,553 filed Jan. 10, 2007, 60/879,577 filed Jan. 10, 2007, 60/879,599 filed Jan. 10, 2007, and 60/879,588 filed Jan. 10, 2007, the entire contents of each of which is hereby incorporated herein by reference.

CO-PENDING APPLICATIONS

The following applications are being filed concurrently with the present application. The entire contents of each of the following applications is hereby incorporated herein by reference: A NAVIGATION DEVICE AND METHOD FOR EARLY INSTRUCTION OUTPUT (application Ser. No. 11/907,229) filed on even date herewith; A NAVIGATION DEVICE AND METHOD FOR ESTABLISHING AND USING PROFILES (application Ser. No. 11/907,230) filed on even date herewith; A NAVIGATION DEVICE AND METHOD RELATING TO AN AUDIBLE RECOGNITION MODE (application Ser. No. 11/907,232) filed on even date herewith; NAVIGATION DEVICE AND METHOD FOR PROVIDING POINTS OF INTEREST (application Ser. No. 11/907,233) filed on even date herewith; A NAVIGATION DEVICE AND METHOD FOR FUEL PRICING DISPLAY (application Ser. No. 11/907,234) filed on even date herewith; A NAVIGATION DEVICE AND METHOD FOR INFORMATIONAL SCREEN DISPLAY (application Ser. No. 11/907,235) filed on even date herewith; A NAVIGATION DEVICE AND METHOD FOR DEALING WITH LIMITED ACCESS ROADS (application Ser. No. 11/907,243) filed on even date herewith; A NAVIGATION DEVICE AND METHOD FOR TRAVEL WARNINGS (application Ser. No. 11/907,244) filed on even date herewith; A NAVIGATION DEVICE AND METHOD FOR DRIVING BREAK WARNING (application Ser. No. 11/907,227) filed on even date herewith; A NAVIGATION DEVICE AND METHOD FOR ISSUING WARNINGS (application Ser. No. 11/907,242) filed on even date herewith; A NAVIGATION DEVICE AND METHOD FOR DISPLAY OF POSITION IN TEXT READIBLE FORM (application Ser. No. 11/907,241) filed on even date herewith; A NAVIGATION DEVICE AND METHOD FOR EMERGENCY SERVICE ACCESS (application Ser. No. 11/907,228) filed on even date herewith; A NAVIGATION DEVICE AND METHOD FOR PROVIDING REGIONAL TRAVEL INFORMATION IN A NAVIGATION DEVICE (application Ser. No. 11/907,240) filed on even date herewith; A NAVIGATION DEVICE AND METHOD FOR USING SPECIAL CHARACTERS IN A NAVIGATION DEVICE (application Ser. No. 11/907,239) filed on even date herewith; A NAVIGATION DEVICE AND METHOD USING A PERSONAL AREA NETWORK (Ser. No. 11/907,238) filed on even date herewith; A NAVIGATION DEVICE AND METHOD USING A LOCATION MESSAGE (Ser. No. 11/907,237) filed on even date herewith; A NAVIGATION DEVICE AND METHOD FOR CONSERVING POWER (application Ser. No. 11/907,236) filed on even date herewith; A NAVIGATION DEVICE AND METHOD FOR USING A TRAFFIC MESSAGE CHANNEL (application Ser. No. 11/907,253) filed on even date herewith; A NAVIGATION DEVICE AND METHOD FOR USING A TRAFFIC MESSAGE CHANNEL RESOURCE (application Ser. No. 11/907,252) filed on even date herewith; A NAVIGATION DEVICE AND METHOD FOR QUICK OPTION ACCESS (Ser. No. 11/907,251) filed on even date herewith; A NAVIGATION DEVICE AND METHOD FOR DISPLAYING A RICH CONTENT DOCUMENT (Ser. No. 11/907,257) filed on even date herewith.

FIELD

The present application generally relates to navigation methods and devices.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device. To aid in navigation of the route, map information is visually output along the route of travel to a user of the navigation device.

SUMMARY

The inventors discovered that output of visual information can be difficult for a user to perceive. For example, although 2D and 3D views are typically displayable to a user of the navigation device, the 2D display may be flat and may hide route details due to, for example, being overlaid with other images such as buildings, etc. Even the 3D display may feel flat to a user and this rendered map image may remove the user from a feeling of reality. As such, the inventors have discovered that the user may be confused because it is difficult for the user to match the displayed information to the real situation viewed by the user during driving of a vehicle, for example (or even possibly during travel on foot).

In at least one embodiment of the present application, a method includes determining map information for display on an integrated input and display device of a navigation device, based upon a determined route of travel of the navigation device; determining, prior to display on the integrated input and display device of the navigation device, whether or not the determined map information includes at least one designated pattern; enhancing, upon determining that the determined map information includes at least one designated pattern, the determined at least one designated pattern; and displaying the determined map information, including the enhanced at least one designated pattern, in three dimensions on the integrated input and display device of the navigation device.

In at least one embodiment of the present application, a navigation device includes a processor to determine map information for subsequent display, based upon a determined route of travel of the navigation device, the processor further being useable to determine, prior to display, whether or not the determined map information includes at least one designated pattern and to enhance, upon determining that the determined map information includes at least one designated pattern, the determined at least one designated pattern; and an integrated input and display device to display the determined map information, including the enhanced at least one designated pattern, in three dimensions.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
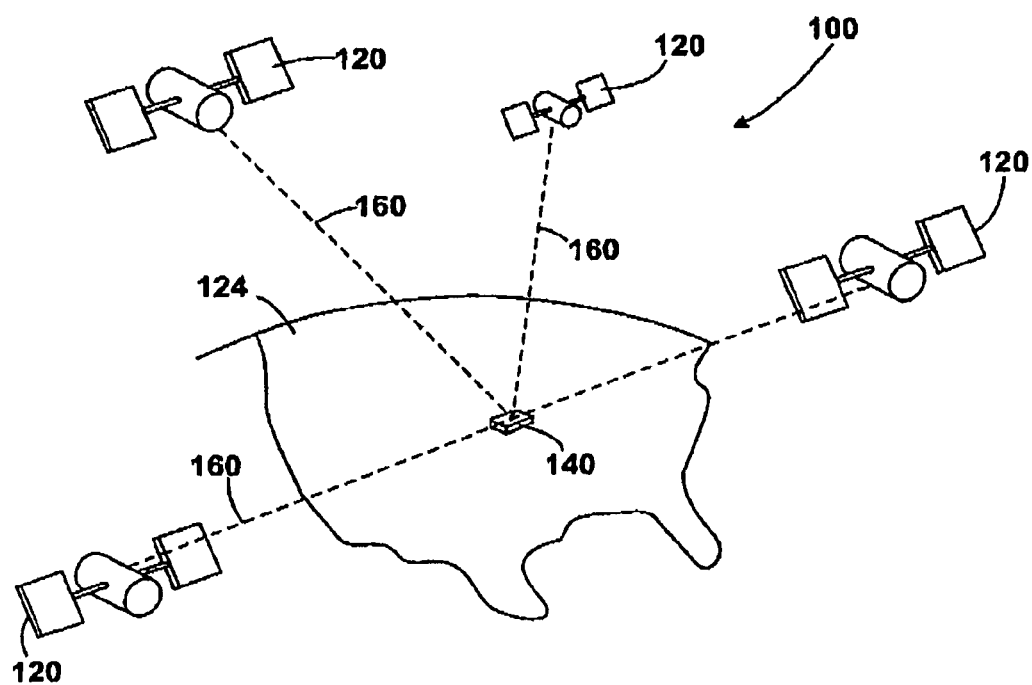
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
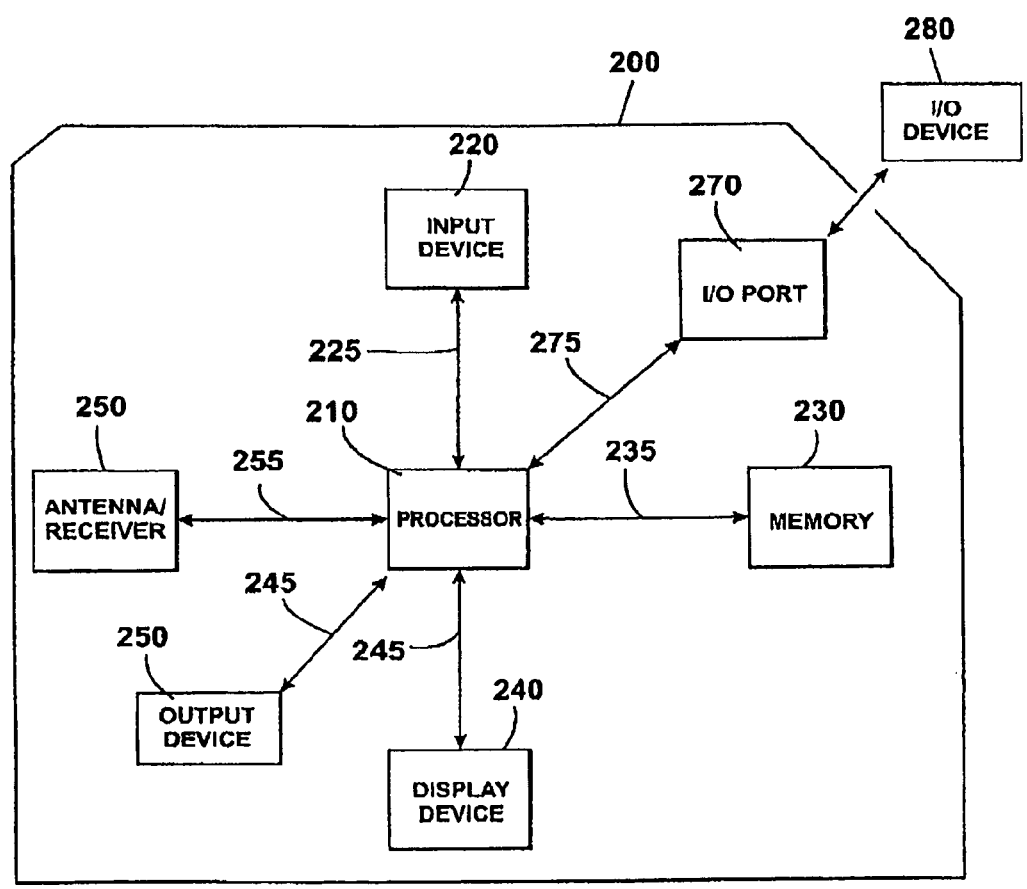
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectable to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
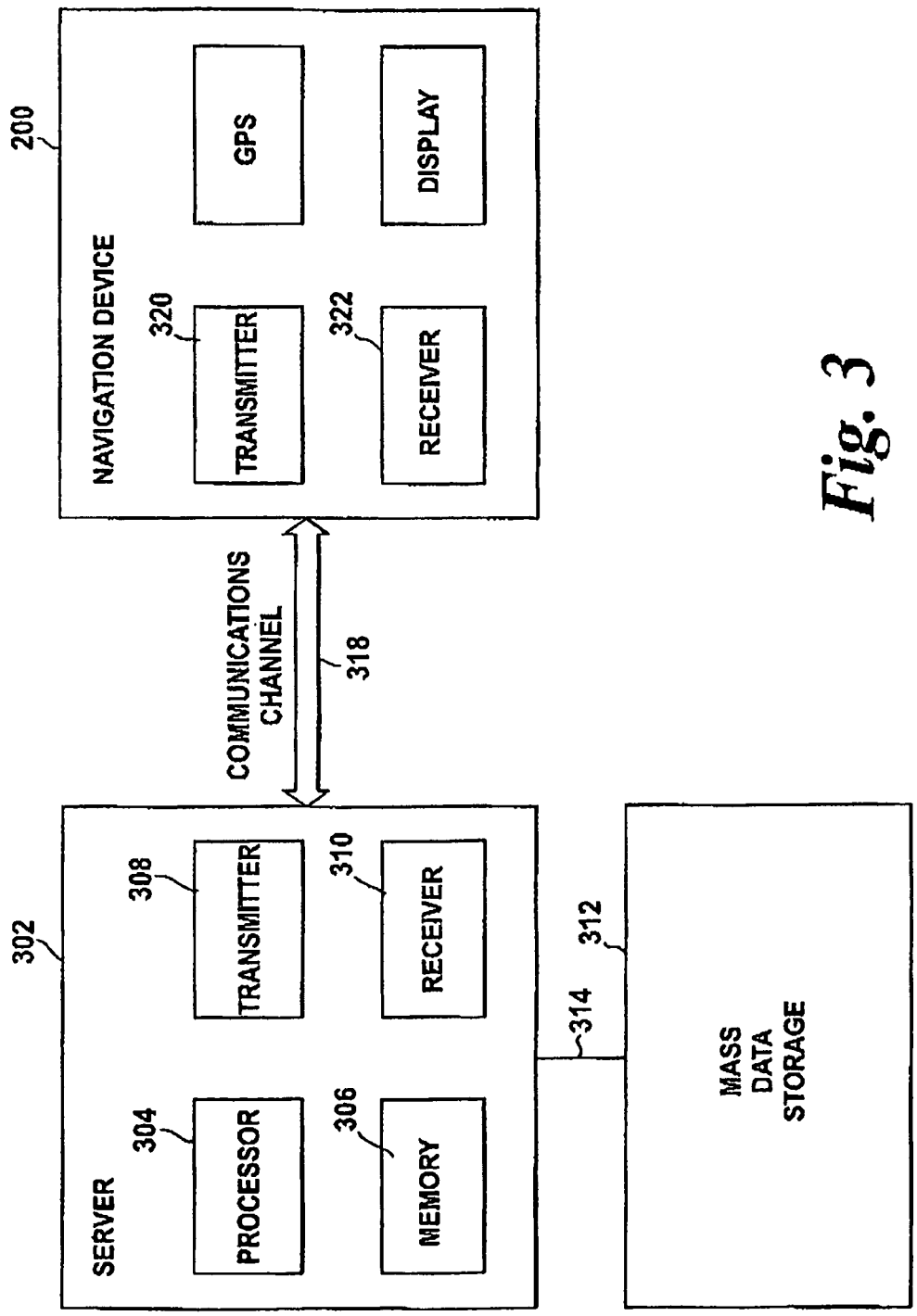
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
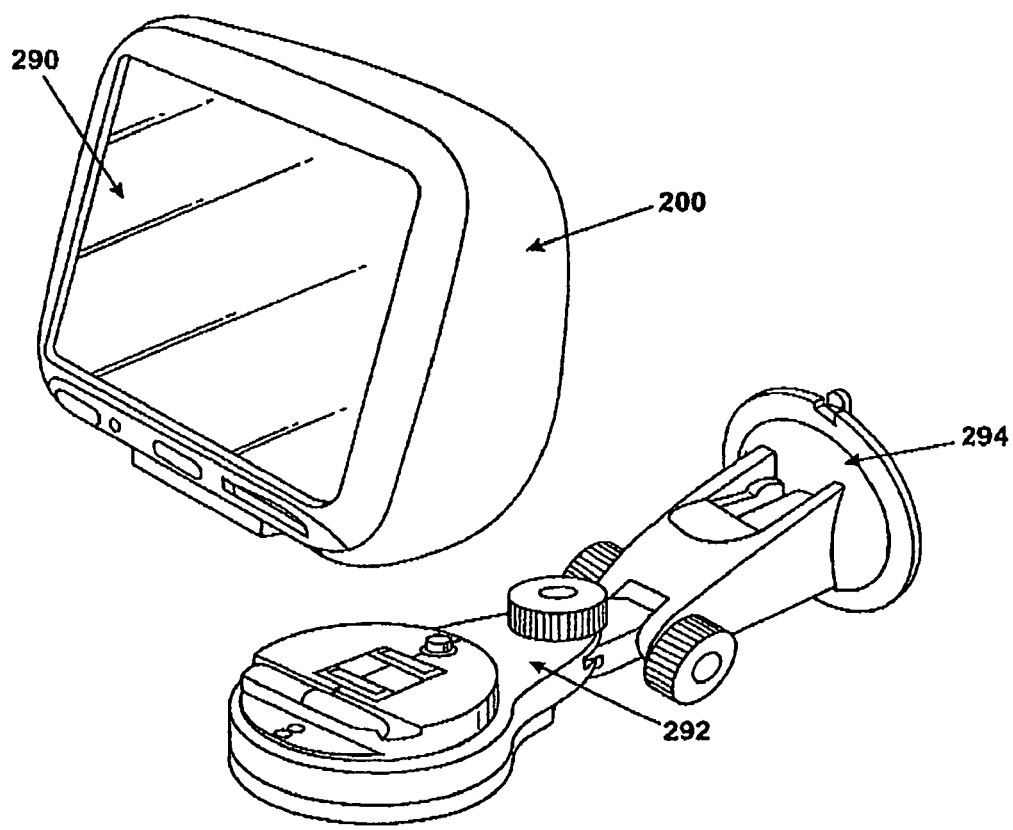
FIGS. 4A and 4B are perspective views of an implementation of an embodiment of the navigation device 200.
Figure 4B:
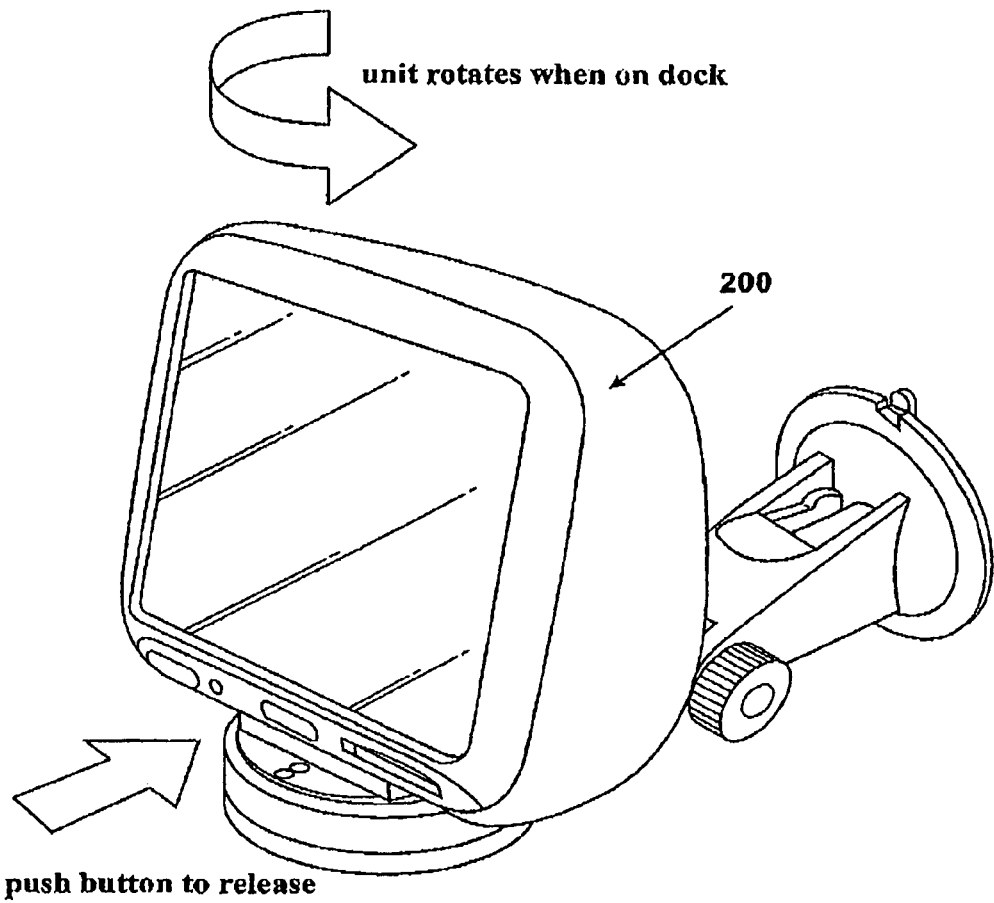

FIGS. 4A and 4B are perspective views of an implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

In at least one embodiment of the present application, a method includes determining map information for display on an integrated input and display device 290 of a navigation device 200, based upon a determined route of travel of the navigation device 200; determining, prior to display on the integrated input and display device 290 of the navigation device 200, whether or not the determined map information includes at least one designated pattern; enhancing, upon determining the determined map information includes at least one designated pattern, the determined at least one designated pattern; and displaying the determined map information, including the enhanced at least one designated pattern, in three dimensions on the integrated input and display device 290 of the navigation device 200.

In at least one embodiment of the present application, a navigation device 200 includes a processor to determine map information for subsequent display, based upon a determined route of travel of the navigation device 200, the processor further being usable to determine, prior to display, whether or not the determined map information includes at least one designated pattern and to enhance, upon determining that the determined map information includes at least one designated pattern, the determined at least one designated pattern; and an integrated input and display device 290 to display the determined map information, including the enhanced at least one designated pattern, in three dimensions.

Figure 5:
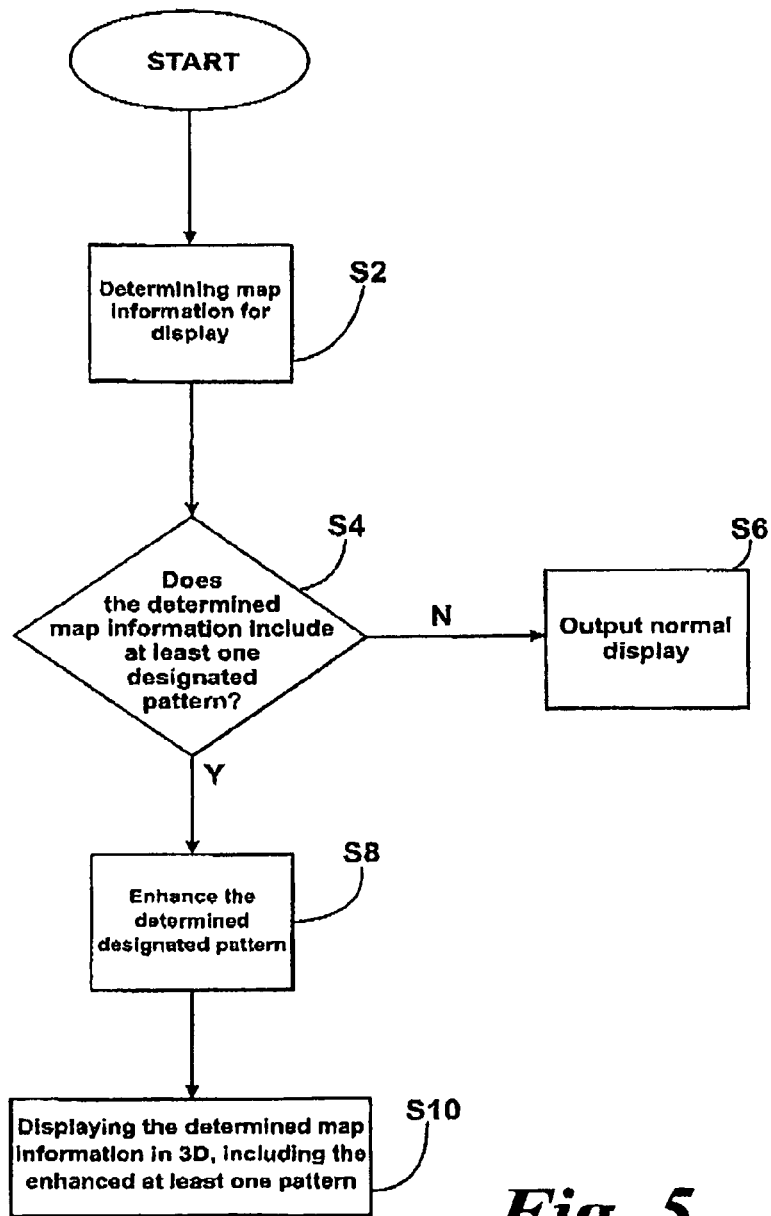
FIG. 5 illustrates a flow chart of an example embodiment of the present application.

FIG. 5 illustrates one example embodiment of the present application.

As shown in FIG. 5, based upon a determined route of travel of the navigation device 200, map information is determined, by processor 210 for example, for display in step S2. A route of travel of the navigation device 200 may be initially determined, by the processor 210 for example, upon input or selection of a desired travel destination and upon detection of a current location via a GPS signal for example, wherein determination of a route of travel from stored map information utilizing the current GPS location and input of selected travel designation can be done in a known manner by processor 210 for example.

Thereafter, in step S4, the processor 210 determines whether or not the determined map information includes at least one designated pattern. This can be done prior to display of the map information on an integrated input and display device 290 of the navigation device 200 for example. If the answer is no, then the system may output a normal display in step S6 for example, on the integrated input and display device 290 of the navigation device 200 for example.

However, if the answer to the question posed in step S4 is yes, the process moves to step S8, wherein the determined at least one designated pattern is enhanced. Thereafter, in step S10, the determined map information may be displayed, including the enhanced at least one designated pattern, in three dimensions on an integrated input and display device 290 of the navigation device 200 for example.

For example, the processor 210 may compare pixels in columns of the rendered 3D map stored in memory 230. In at least one non-limiting example embodiment regarding building colors, if two pixels above each other have the building color, for example, and the one below does not, then the pixel below and the one above that one (the middle pixel) are changed into a new building shade color. In at least one non-limiting example embodiment regarding water colors, if two pixels above each other have the water color and the one above those two does not (and/or also does not have the water edge color), then a middle pixel may be changed into the water edge color.

Figure 6:
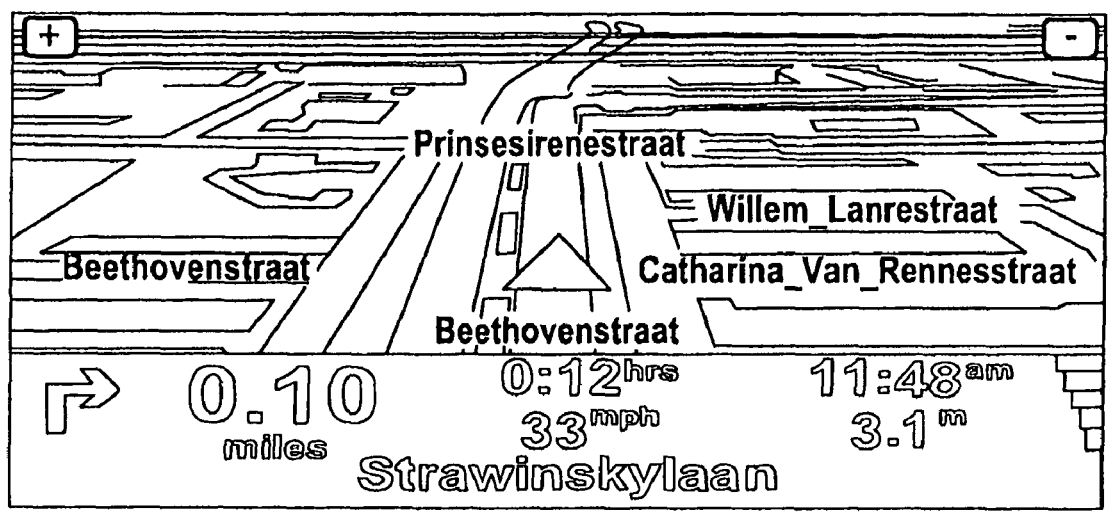
FIG. 6 illustrates an example of a conventional display.

FIG. 6 illustrates a conventional display. As can be seen in FIG. 6, even in a 3D display mode, the rendering may be "flat." This removes the feeling of reality from the rendered image and may confuse the user because he cannot match the rendered map on the display screen with the real situation currently viewed by the user.

Figure 7:
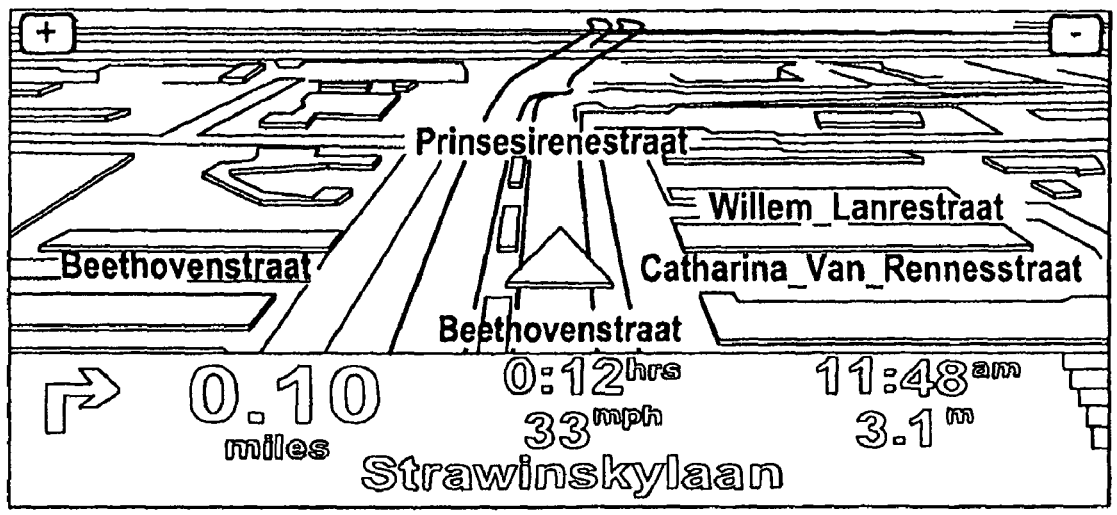
FIG. 7 illustrates an example of an enhanced display of an embodiment of the present application.
Figure 8:
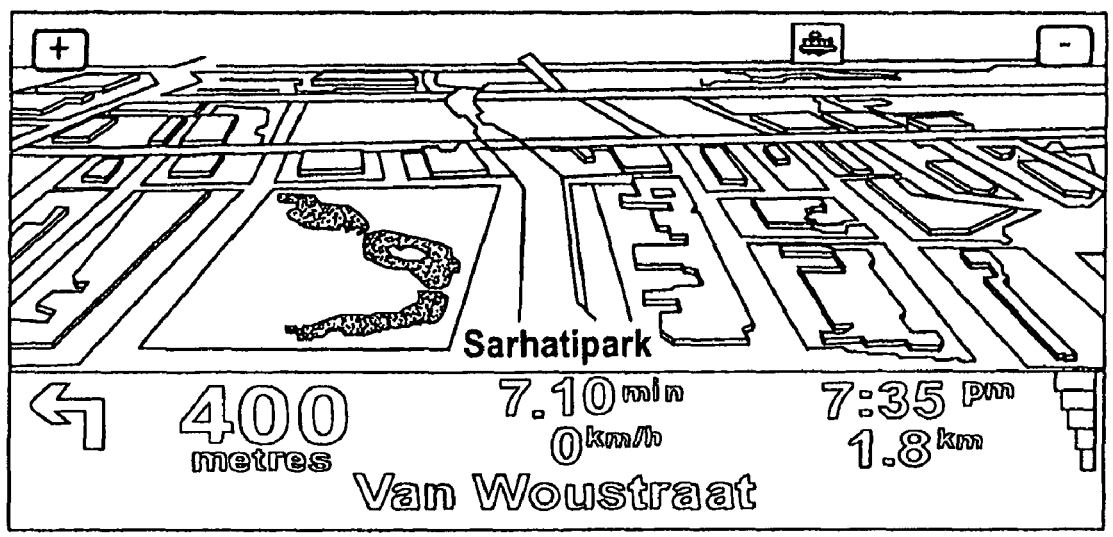
FIG. 8 illustrates an example of an enhanced display of an embodiment of the present application.
Figure 9:
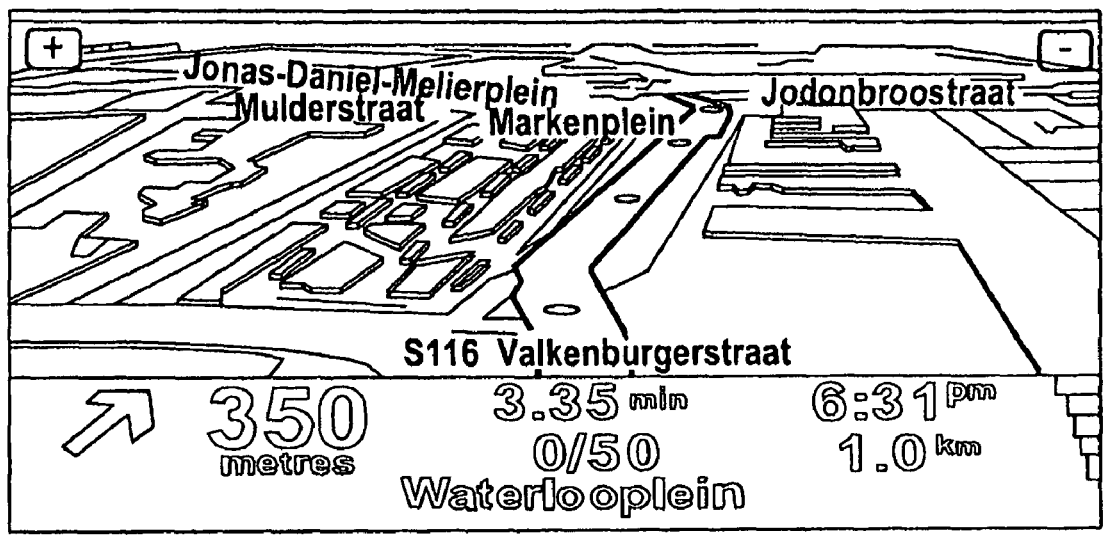
FIG. 9 illustrates an example of an enhanced display of an embodiment of the present application.

In at least one embodiment of the present application, at least a portion of determined map information determined for a route of travel of the navigation device 200, may be enhanced. An example of this is shown in FIGS. 7 to 9 of the present application for example. The enhancing may include at least one of emphasizing outlines, changing the color shading, and increasing a number of pixels representing at least a portion of the determined at least one designated pattern. The at least one designated pattern may include at least one of a body of water and a building footprint as shown in FIGS. 7 to 9 for example, wherein such information may be scanned or otherwise looked for by a processor 210 of the navigation device 200.

For example, the determining of whether or not the determined map information includes at least one designated pattern, by a processor 210 of the navigation device 200 for example, can include the processor 210 scanning the determined map information to detect an edge, such as a horizontal, diagonal or near vertical edge for example, of at least one of a body of water and a building footprint. Thereafter, the enhancing can include the processor 210 emphasizing an outline of the detected edge. This may be done, for example, by the processor 210 scanning a bitmap of received map information, from storage in memory 230 for example, for a determined route of travel in a navigation device 200, looking for edges (such as a horizontal, diagonal or near vertical edges for example), for example, of a building or body of water. Once found, the processor 210 may draw a darker line underneath the building, for example, as shown in FIG. 7, to make it look like the side of the building for example. As such, the processor 210 may change the map information prior to display on the integrated input and display device 290.

For example, in at least one non-limiting embodiment, the processor 210 compares each pixel with the one above and below it. Then, if an edge or transition is detected for that pixel by the processor 210, then the pixel is changed into a different color. Examples are shown in FIGS. 10A (before enhancement of building edge), 10B (after enhancement of building edge), 11A before enhancement of water edge) and 11B (after enhancement of water edge).

Figure 10A:
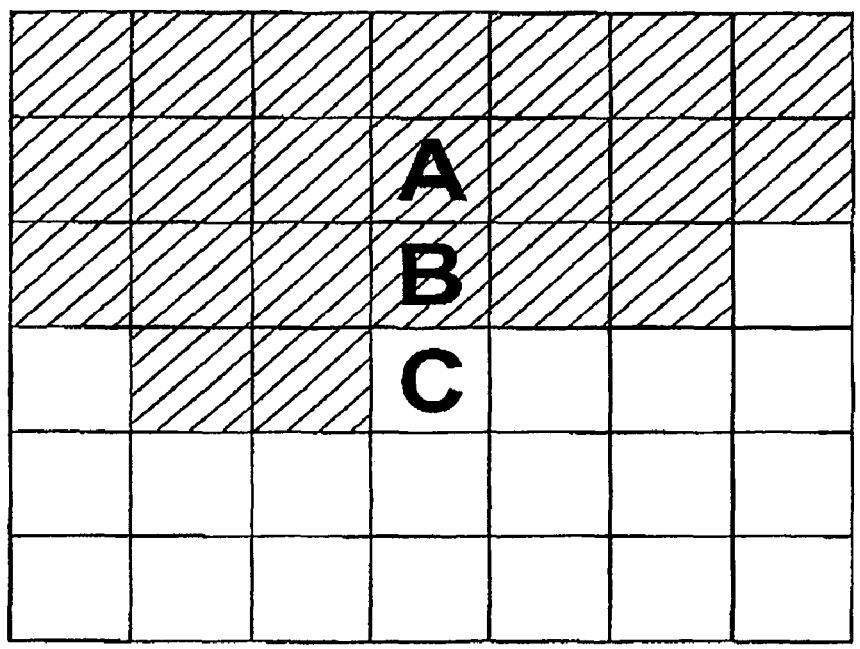
FIGS. 10A and 10B respectively illustrate an example of original pixels and an example of enhanced pixels of an embodiment of the present application.

For example, as shown in FIG. 10A, after scanning or reviewing stored bitmap information, the processor 210 determines that a pixel A of FIG. 10A is of a building color and that pixel B of FIG. 10A is of a building color, and determines that pixel C of FIG. 10A is not of a building color (represented in FIG. 10A, for example, by the fact that pixel C is shown in a different gray scale than pixels A and B). For example, the processor 210 may be supplied with information regarding what is a building color, for example, and then compares this information to the color information of pixels A-C for example. If the processor 210 determines that a pixel A of FIG. 10A is of a building color and that pixel B of FIG. 10A is of a building color, and determines that pixel C of FIG. 10A is not of a building color, then the processor 210 recognizes an edge that needs to be enhanced in the map information, and directs that the pixel B and pixel C be changed into a building edge color as shown in FIG. 10C to thereby enhance the edge of the building.

Figure 11A:
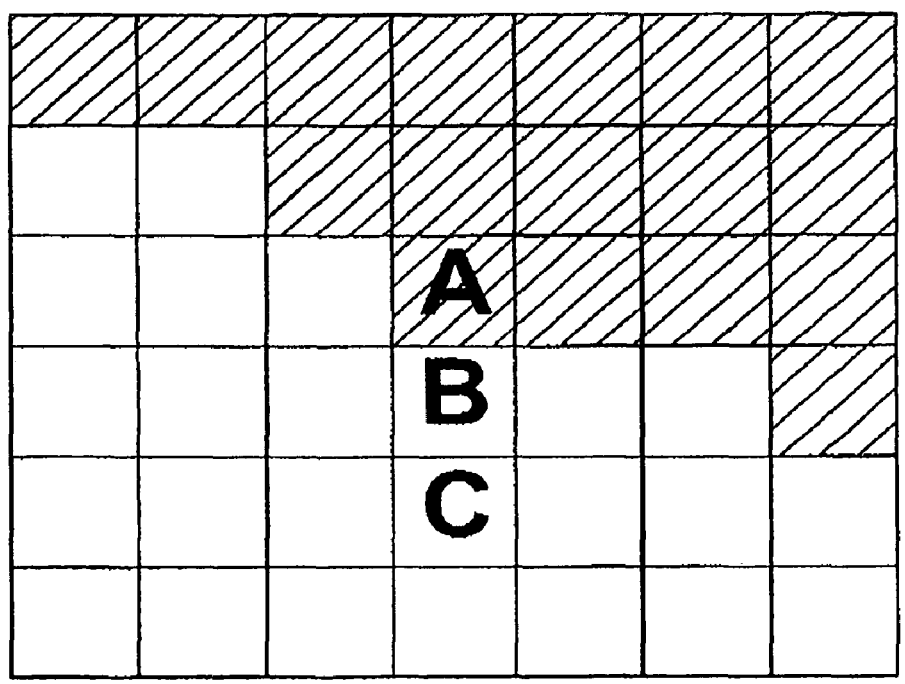
FIGS. 11A and 11B respectively illustrate an example of original pixels and an example of enhanced pixels of an embodiment of the present application.
Figure 11B:
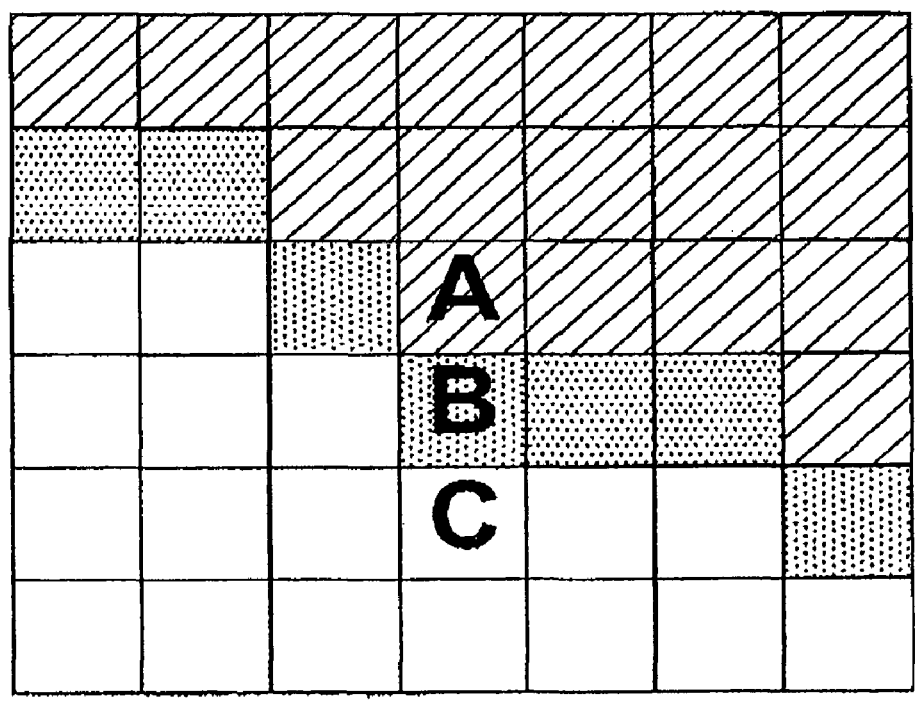

In another example as shown in FIG. 11A, after scanning or reviewing stored bitmap information, the processor 210 determines that a pixel A of FIG. 11A is of not of a water color and pixel A is not of a water edge color, and that pixel B is of a water color and that pixel C is of a water color, then the processor 210 recognizes an edge that needs to be enhanced in the map information, and directs that the pixel B be changed into a water edge color as shown in FIG. 11C to thereby enhance the edge of the water.

Such a determination may be made, by the processor 210, for each pixel in the stored bitmap from left to right and top to bottom. An extra determination may be performed for water on pixel A to make sure that it is not of a water color or a water edge color as explained above to ensure that an edge is not smeared over the map information while processing from top to bottom, for example.

In at least one embodiment, there may be a variation for buildings, for example, wherein only pixel B may be changed if the building is farther than a threshold number of meters from the bottom of the screen (less 'tall' buildings toward the horizon). Building edges are typically not applied as the building is farther than a threshold number of meters from the bottom of the screen for example, i.e. far away buildings do not get emphasized with an edge. Still further, the distance is meters may be transformed to the projected height on the 3D screen to determine from which row the building edge processing should be applied.

Thus, the determining may include the processor 210 scanning the determined map information to detect at least one of a body of water and a building footprint for example, wherein such information may be flagged or otherwise designated for example. The enhancing may then include the processor 210 changing a color shade of at least a portion of the body of water and/or building footprint, for example.

In at least one embodiment, the aspect of scanning the determined map information to detect at least one of a body of water and building footprint may alternatively be done by the processor 210 scanning every pixel of the bitmap of received map information from memory 230 for a determined route of travel, from left to right and top to bottom, and searching for a vertical pattern like, for example,

[B]
[B]
[X], wherein B is a building color and X is not a building color. Thus, two pixels may be detected by the processor 210 of the building color, with one pixel underneath not being of a building color. Thereafter, the processor 210 may change this information into, for example:

[B]
[S]
[S], wherein S is a side color (namely a relatively darker version of the building color). As such, a change in color shade can occur via the processor 210. This enhanced information may then be stored, at least temporarily, and then displayed on the integrated input and display device 290.

Somewhat similarly, the processor 210 may scan every pixel of the bitmap of received map information for a determined route of travel to search for a body of water, namely, to search for a vertical pattern like, for example,

[X]
[W]
[W], wherein X is not a water color, and W is a water color but not a water edge color. Thereafter, the processor 210 may enhance the information by changing a color shade of at least a portion of the body of water as follows. For example, the processor 210 may change the aforementioned information into

[X]
[S]
[W], where S is a water edge color (namely a relatively darker version of the water color). This enhanced information may then be stored, at least temporarily, and then displayed on the integrated input and display device 290. An example of this is shown, for example, in FIG. 8, wherein the edge of the water has been emphasized by processor 210.

In addition, and/or alternatively, the determining by the processor 210 may include scanning the determined map information to detect at least one of a body of water and a building footprint, by any of the manners previously discussed, and the enhancing may include the processor 210 increasing the number of pixels representing at least a portion of at least one of the body of water and a building footprint. For example, once detected, instead of changing at least a portion of the building to a relatively darker version of the building color, and/or instead of changing at least a portion of the water edge to a relatively darker version of the water color, pixels can be increased for these portions, such as by adding more pixels to a building portion or a water edge portion to enhance the image for example.

Figure 10B:
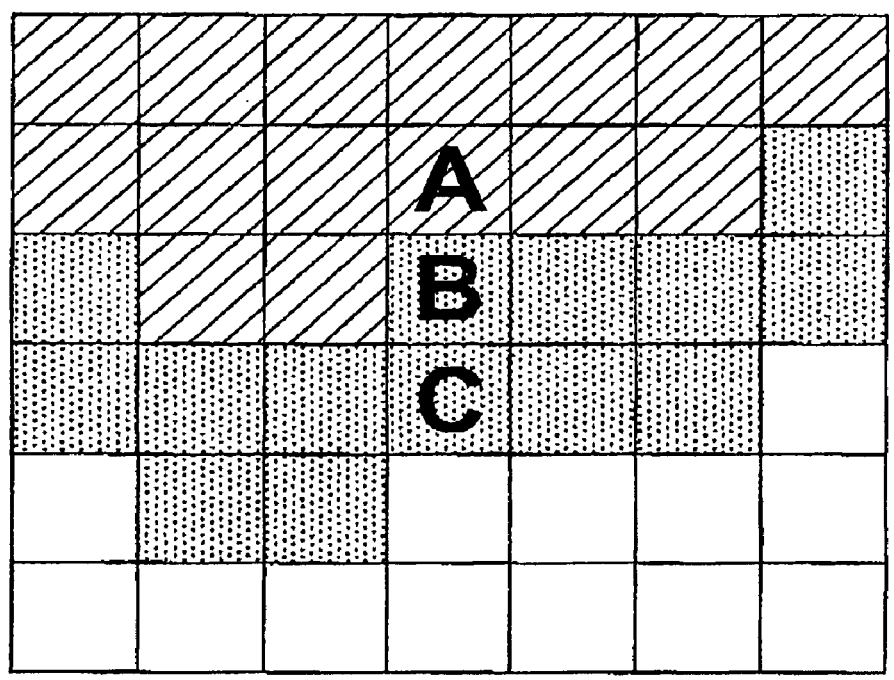

As discussed above in FIGS. 10A and 10B for example, the building size (including the edge pixels) may be effectively increased by 1 pixel. The building may be represented on the displayed map as one pixel larger in height for each horizontal pixel, after the edge pixel has been added.

Figure 12:
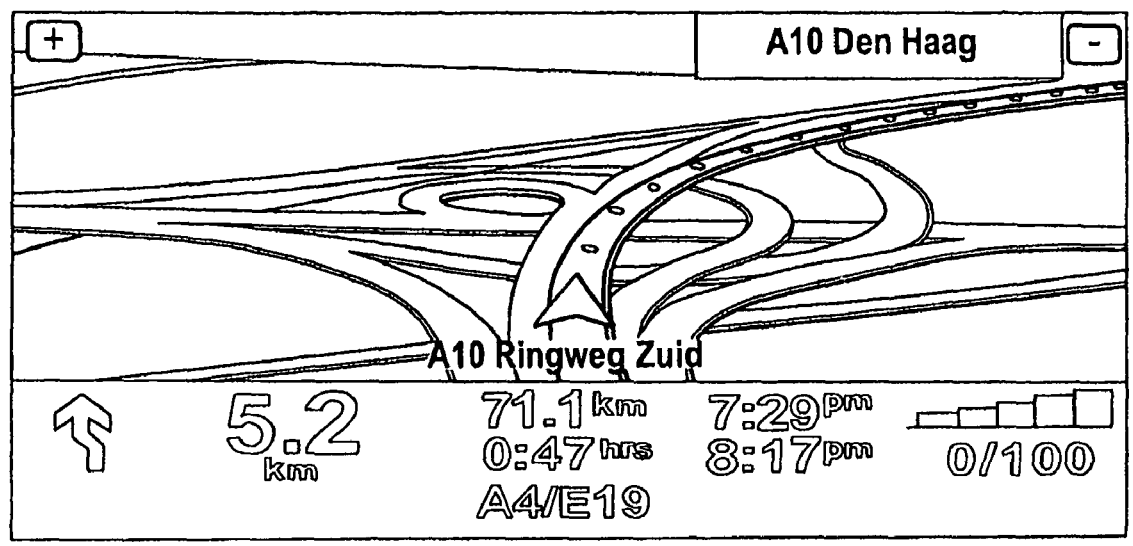
FIG. 12 illustrates example of an enhanced display of an embodiment of the present application.

In addition, it should be noted that other types of surfaces, different from bodies of water and buildings, can be determined by the processor 210 in the determined map information based upon a route of travel of the navigation device 200. Such information can include, for example, roads, woods, fields, etc., and can be enhanced by the processor 210 in any of the manner previously described. Such an example of enhancement of road information is shown in the navigation display of FIG. 12.

It should be noted that each of the aforementioned aspects of an embodiment of the present application have been described with regard to the method of the present application. However, at least one embodiment of the present application is directed to a navigation device 200, including a processor 210 to determine map information for subsequent display, based upon a determined route of travel of the navigation device 200, the processor 210 further being useable to determine, prior to display, whether or not the determined map information includes at least one designated pattern and to enhance, upon the processor 210 determining that the determined map information includes at least one designated pattern, the determined at least one designated pattern; and an integrated input and display device 290 to display the determined map information, including the enhanced at least one designated pattern, in three dimensions integrated input and display device 290 The processor 210 to enable options and/or to enable display of icons, upon receipt of an indication of selection of options. Thus, such a navigation device 200 may be used to perform the various aspects of the method described with regard to FIG. 5, as would be understood by one of ordinary skill in the art. Thus, further explanation is omitted for the sake of brevity.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
    determining map information for display on an integrated input and display device of a navigation device;
    determining, prior to display on the integrated input and display device of the navigation device, whether or not the determined map information includes at least one designated pattern indicating at least one edge of at least one of a body of water and a building footprint;
    emphasizing, upon determining that the determined map information includes at least one designated pattern indicating the at least one edge, the determined at least one designated pattern indicating the at least one edge; and displaying the determined map information, including the emphasized at least one designated pattern indicating the at least one edge, in three dimensions on the integrated input and display device of the navigation device.

2. The method of claim 1, wherein the emphasizing includes at least one of emphasizing outlines, changing a color shade and increasing a number of pixels representing at least a portion of the determined at least one designated pattern indicating the at least one edge.

3. The method of claim 1, wherein the emphasizing includes emphasizing an outline of the determined at least one designated pattern indicating the at least one edge.

4. The method of claim 1, wherein the emphasizing includes changing a color shade of at least a portion of the at least one of a body of water and a building footprint.

5. The method of claim 1, wherein the emphasizing includes increasing a number of pixels representing at least a portion of the at least one of a body of water and a building footprint.

6. A computer readable medium including program segments for, when executed on a processor of a navigation device, causing the navigation device to implement the method of claim 1.

7. The method of claim 1, wherein the at least one edge of the body of water corresponds to an upper edge of the body of water and the at least one edge of the building footprint corresponds to a lower edge of the building footprint.

8. A navigation device, comprising:
a processor to determine map information for subsequent display, the processor further being useable to determine, prior to display, whether or not the determined map information includes at least one designated pattern indicating at least one edge of at least one of a body of water and a building footprint, and to emphasize, upon determining that the determined map information includes at least one designated pattern indicating the at least one edge, the determined at least one designated pattern indicating the at least one edge; and an integrated input and display device to display the determined map information, including the emphasized at least one designated pattern indicating the at least one edge, in three dimensions.

9. The navigation device of claim 8, wherein the emphasizing, by the processor, includes at least one of emphasizing outlines, changing a color shade and increasing a number of pixels representing at least a portion of the determined at least one designated pattern.

10. The navigation device of claim 8, wherein the emphasizing, by the processor, includes emphasizing an outline of the at least one designated pattern indicating at least one edge of at least one of a body of water and a building footprint.

11. The navigation device of claim 8, wherein the emphasizing, by the processor, includes changing a color shade of at least a portion of the at least one of a body of water and a building footprint.

12. The navigation device of claim 8, wherein the emphasizing, by the processor, includes increasing a number of pixels representing at least a portion of the at least one of a body of water and a building footprint.

13. The navigation device of claim 8, wherein the at least one edge of the body of water corresponds to an upper edge of the body of water and the at least one edge of the building footprint corresponds to a lower edge of the building footprint.

* * * * *